United States Patent
Tsumori

(10) Patent No.: US 7,238,384 B2
(45) Date of Patent: *Jul. 3, 2007

(54) SUBSTRATE FOR PERPENDICULAR MAGNETIC RECORDING HARD DISK MEDIUM AND METHOD FOR PRODUCING THE SAME

(75) Inventor: Toshihiro Tsumori, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/181,109

(22) Filed: Jul. 14, 2005

(65) Prior Publication Data

US 2005/0282037 A1 Dec. 22, 2005

Related U.S. Application Data

(62) Division of application No. 10/646,506, filed on Jun. 3, 2003, now abandoned.

(30) Foreign Application Priority Data

Aug. 26, 2002 (JP) ............................. 2002-244837
Aug. 26, 2002 (JP) ............................. 2002-244838

(51) Int. Cl.
  B05D 5/12 (2006.01)
  C03C 27/00 (2006.01)
  C03C 29/00 (2006.01)
(52) U.S. Cl. .................. 427/129; 427/130; 427/131; 428/831; 428/832
(58) Field of Classification Search ................ 428/827, 428/831, 900, 832, 836.1, 846.9, 700; 427/129, 427/130, 131; 29/603.08, 603.14, 603.18; 369/283, 284, 286; 360/135, 136
  See application file for complete search history.

(56) References Cited

U.S. PATENT DOCUMENTS

| 4,376,963 | A | 3/1983 | Knoop et al. ............... 427/131 |
| 4,689,260 | A | 8/1987 | Briska et al. .......... 428/694 ST |
| 5,143,794 | A | 9/1992 | Suzuki et al. ............... 428/611 |
| 6,248,416 | B1 | 6/2001 | Lambeth et al. ............ 428/65.3 |
| 6,338,899 | B1 * | 1/2002 | Fukuzawa et al. .......... 428/900 |
| 6,356,406 | B1 | 3/2002 | Takano et al. ................. 360/81 |
| 6,403,240 | B1 | 6/2002 | Kanbe et al. .......... 428/694 TS |
| 6,472,063 | B1 * | 10/2002 | Watase ....................... 428/336 |
| 6,638,648 | B2 | 10/2003 | Yamamoto et al. .. 428/694 TM |
| 6,686,070 | B1 | 2/2004 | Futamoto et al. ....... 428/694 TS |
| 6,753,101 | B1 | 6/2004 | Abarra et al. ......... 428/694 TM |
| 2001/0017833 | A1 | 8/2001 | Yamada et al. ........... 369/59.11 |
| 2002/0058160 | A1 | 5/2002 | Oikawa et al. ..... 428/694 OTS |
| 2002/0068199 | A1 | 6/2002 | Futamoto et al. ... 428/694 OTS |
| 2002/0118477 | A1 | 8/2002 | Ikeda et al. .................... 360/55 |

FOREIGN PATENT DOCUMENTS

| JP | 145140 | 7/1982 |
| JP | 142048 | 1/1984 |
| JP | 241089 | 6/1984 |
| JP | 259523 | 6/1986 |
| JP | 4259908 | 9/1992 |
| JP | 668463 | 3/1994 |
| JP | 628655 | 5/1994 |

OTHER PUBLICATIONS

Ohashi, K., et al. "Write Performance of Heads with a 2.1-Tesla CoNiFe Pole" *IEEE Transactions on Magnetics* 35(5):2538-2540. (Sep. 1999).
Ohashi, K. and Y. Yasue "Newly Developed Inductive Write Head with Electroplated CoNiFe Film" *IEEE Transactions on Magnetics* 34(4):1462-1464. (Jul. 1998).
Osaka, T., Et al. "A Soft Magnecic CoNiFe Film with High Saturation Magnetic Flux Density and Low Coercivity" *Nature* 392:796-798 (Apr. 23, 1998).

\* cited by examiner

*Primary Examiner*—Carol Chaney
*Assistant Examiner*—Louis de Falasco
(74) *Attorney, Agent, or Firm*—Myers, Bigel, Sibley & Sajovec, P.A.

(57) ABSTRACT

Proposed are a substrate that comprises an easily producible soft magnetic backing film and can reduce spike noise from the soft magnetic backing film, and a method for producing the substrate. More specifically, provided are a substrate for a perpendicular magnetic recording hard disk medium, comprising an Si single crystal substrate (1) having a diameter of 65 mm or less, a thickness of 1 mm or less and an average surface roughness (Rms) of 1 nm or more and 1000 nm or less; an under-plated layer (2) formed on the substrate, the layer (2) comprising one or more metals selected from a group consisting of Ni, Cu and Ag and having a thickness of 1 nm to 300 nm; and a plated soft magnetic layer (3) formed on the under-plated layer, the layer (3) having a thickness of 50 nm or more and less than 1000 nm, a coercivity of 20 Oe(oersteds) or less and a saturation magnetization of 1T or more, wherein the average surface roughness (Rms) of the plated soft magnetic layer is 0.1 nm or more and 5 nm or less.

11 Claims, 1 Drawing Sheet

SUBSTRATE FOR PERPENDICULAR MAGNETIC RECORDING HARD DISK MEDIUM AND METHOD FOR PRODUCING THE SAME

CROSS-REFERENCE TO RELATED APPLICATIONS

This application is a divisional application of U.S. application Ser. No. 10/646,506 filed on Aug. 22, 2003 now abandoned, which claims priority to Japanese Patent Application Nos. 2002-244837 and 2002-244838, both filed Aug. 26, 2002, the disclosures of which are incorporated herein by reference in its entirety.

BACKGROUND OF THE INVENTION

1. Field of the Invention

The present invention relates to a substrate for use in a perpendicular magnetic recording hard disk and a method for producing the same.

2. Description of the Related Art

In the field of magnetic recording, information recording by hard disk apparatus is indispensable for primary external storage apparatuses in computers including personal computers. In recent years, the improvement in magnetic recording density in hard disk apparatus has been significant, rising at a rate of 100% or more per year. The recording density has reached close to 60 Gbits/inch$^2$ at research levels and 30 Gbits/inch$^2$ even at product levels.

This high recording density has been attained by remarkable improvement in the performance of various mechanical and electronic elements such as electronic components constituting hard disk apparatus and related software. In particular, this high recording density is largely attributed to the progress of magnetic heads (thin-film heads, MR heads, GMR heads, etc.) for reading/writing recorded information and the progress of error correction methods (software) for improving the reliability of signals having been read. Nevertheless, there are no particular changes in the basic recording system and the configuration of the apparatus, that is, the apparatus is configured on the basis of the horizontal magnetic recording system.

However, because of the improvement in magnetic recording density, the volume of a recording layer per bit for magnetic recording has decreased abruptly. In order to improve the recording density, it is necessary to improve both the linear recording density in the radial direction. However, problems are caused particularly in the improvement in the linear recording density because of reasons in the principle of the magnetic recording system. This will be described below in detail.

The magnetic recording system is broadly divided into the horizontal magnetic recording system and the perpendicular magnetic recording system as schematically shown in FIG. 2 and FIG. 3 depending on the magnetic unit (bit) arrangement system for holding information on a recording medium.

The horizontal magnetic recording system is a system for carrying out recording so that the magnetic information units formed of S-N magnetic poles become parallel with the plane of a recording medium, and this system is used for conventional hard disk media. On the other hand, the perpendicular magnetic recording system is a system for carrying out recording so that the magnetic information units become perpendicular to the plane of a recording medium, and this system is widely used for videotapes and the like requiring high-density recording.

In the case when the recording density per unit area is improved in magnetic recording, it is necessary to reduce the volume of the magnetic recording unit (bit), as a matter of course.

However, because of problems in the principle of magnetic theory, when the volume of the magnetic substance generating the effects of a ferromagnetic material for carrying out recording is decreased, it is known that stability is not always maintained as the volumes decrease. Owing to the competitiveness between thermal energy kT (k: Boltzmann constant, T: absolute temperature) at room temperature and anisotropic energy $K_uV$ ($K_u$: anisotropic energy, in particular, crystalline magnetic anisotropic energy in the case of magnetic recording, V: the volume of a unit recording bit) for holding the ferromagnetic substance in one direction, it is known that the volume of the magnetic recording unit is extremely small and that the magnetized state of the ferromagnetic substance becomes unstable even at room temperature when $kT \sim K_uV$ is nearly established. In the case when the magnetized volume per bit is extremely small as described above, the state wherein a ferromagnetic substance becomes a paramagnetic substance is referred to as super paramagnetism. It is known that there is a limit dimension (critical volume) at the time when the ferromagnetic substance becomes super paramagnetic, although the dimension differs depending on the magnetic recording material.

In actual magnetic recording, when the recording unit volume is decreased close to the critical dimension by raising the recording density, a problem becomes manifest before the super paramagnetism is reached. In other words, a problem of deteriorating magnetically recorded information (reducing the S/N ratio of the signal read by the magnetic head) occurs, since the ferromagnetic state by magnetic recording decays with time in a relatively short time and the magnetization direction becomes random. If this phenomenon occurs in a magnetic recording, recorded information that was written becomes unable to be read after a lapse of some time or writing itself cannot be carried out. In recent years, this decaying of recording bits owing to this super paramagnetism, referred to as a "Brownian motion" problem, has become an extremely serious problem resulting in determining the limits of magnetic recording.

Although the specific numerical value of the recording limit owing to Brownian motion in the conventional horizontal magnetic recording system is not known, it is assumed to be approximately 100 Gbits/inch$^2$ in terms of the recording density of a hard disk medium.

As systems for solving the problem of the recording limit owing to Brownian motion in the conventional horizontal magnetic recording disk medium, various new recording systems have been proposed. A system regarded and examined as the most promising system is the perpendicular magnetic recording system. In the perpendicular magnetic recording system, the magnetic field from adjacent bits becomes the same direction as the magnetization direction, whereby the stability of the recorded and magnetized bits is supported. In other words, a closed magnetic circuit is formed between adjacent bits, whereby a self-demagnetizing field (hereafter referred to as a demagnetizing field) by self-magnetization in the perpendicular magnetic recording system is small in comparison With the horizontal magnetic recording system, and the magnetized state becomes stable. On the other hand, in the horizontal magnetic recording system, as the linear recording density is raised, adjacent recording bits become closer to each other, and the demagnetizing field becomes larger. In order to raise the linear recording density further, it is necessary to extremely reduce the thickness of the magnetic recording layer so that a rotation magnetization mode does not occur inside the magnetic recording layer. In the horizontal magnetic recording system, as the recording density rises, the volume of the recording bit decreases three-dimensionally. In the perpendicular magnetic recording system, it is not necessary to reduce the thickness of the magnetic film in accordance with the improvement in recording density. In consideration of these, in the perpendicular magnetic recording system, the demagnetizing field can be reduced and the value of $K_u V$ can be obtained securely, whereby the stability of magnetization against Brownian motion is high. Therefore, it is possible to say that the perpendicular magnetic recording system is a recording system that can extend the recording limit much further. The recording medium for the perpendicular magnetic recording system is highly compatible with the horizontal recording medium, and technologies basically similar to those used conventionally can also be used for writing and reading of magnetically recorded information.

However, in detail, there are some points causing problems in commercialization of the perpendicular magnetic recording system. One of them is the construction of a magnetic medium. FIG. 2 is a schematic sectional view showing the film construction of a horizontal magnetic recording medium, and FIG. 3 is a schematic sectional view showing the film construction of a perpendicular magnetic recording medium. In the horizontal magnetic recording medium shown in FIG. 2, a nonmagnetic under layer 103 having a thickness of 20 to 30 nm and a recording layer 104 having a thickness of 20 to 30 nm are formed on a substrate 101. In the perpendicular magnetic recording medium shown in FIG. 3, a soft magnetic layer 105 having a thickness of 100 to 500 nm and a recording layer 104 having a thickness of 20 to 30 nm are formed on a substrate 101.

As substrates for the horizontal magnetic recording system, Al—Mg alloy substrates plated with NiP are mainly used for 3.5-inch substrates, and glass substrates are mainly used for 2.5-inch substrates. On each substrate, a nonmagnetic under film (mainly made of Cr or Cr alloy), a recording film (mainly made of Co—Cr-based alloy), a protection film (mainly made of DLC: diamond-like carbon), a lubrication film, etc., are formed.

In reality, one or more buffer layers are frequently formed between the substrate and the under film or between the under film and the recording film. In a typical construction of films with respect to the thickness values thereof, the thickness of the under film is approximately up to 30 nm and the thickness of the recording film is approximately up to 20 nm at a density of approximately 20 Gbits/inch$^2$.

On the other hand, a perpendicular magnetic recording medium comprises a soft magnetic backing layer (typically made of permalloy or the like), a recording film (candidate materials include a CoCr-based alloy, a multi-layer film obtained by alternately laminating a PtCo layer and ultra-thin films of Pd and Co to form several layers, and a SmCo amorphous film.), a protection film, a lubrication film, etc., on a substrate. There are two significant differences between the horizontal magnetic recording medium and the perpendicular magnetic recording medium, that is, the Cr-based nonmagnetic under layer for the horizontal magnetic recording medium and the soft magnetic backing layer for the perpendicular magnetic recording medium, and the compositions of the recording layer. In particular, the backing. layer of the perpendicular recording medium is required to have soft magnetism and a thickness of approximately 100 nm to 500 nm. The soft magnetic backing film is a path for magnetic flux from the upper recording film and also a path for writing magnetic flux from the recording head. Hence, the film plays the same role as the iron yoke of a permanent magnetic circuit. The film is required to be relatively very thick in comparison with the film of the horizontal recording medium as described above.

Forming the soft magnetic backing film of the perpendicular recording medium is not easy in comparison with forming the nonmagnetic Cr-based under film of the horizontal recording medium.

Usually, all the films of the horizontal recording medium are formed by a dry process (mainly magnetron sputtering). Even in the perpendicular recording medium, film formation by a dry process is a natural trend.

However, forming the soft magnetic backing layer of the perpendicular recording medium by sputtering has problems. Magnetron sputtering is a physical deposition process widely used to form not only magnetic recording media but also metallic thin films. In this process, a target is placed in an atmosphere of thin inert gas, an electrode placed near the target or the target itself is used as an electrode, and target atoms are physically driven away by gas plasma obtained by applying a high frequency wave across the electrodes thereby to form a film. In order to increase the. speed of film formation, a method wherein a permanent-magnet magnetic circuit is disposed on the rear side of the target and the magnetic force leakage to the front side is used to raise the density of plasma is generally used. However, in the case when an attempt is made to form a soft magnetic layer for perpendicular magnetic recording by this magnetron sputtering system, many problems occur. Since the target has soft magnetism, most of the magnetic flux generated from the magnetic circuit passes through the inside of the target and hardly leaks to the outside of the surface of the target. When the leakage amount of the magnetic flux is low, generated plasma becomes weak and unstable, whereby the film formation speed by sputtering cannot be sufficiently attained. In addition, the magnetic flux leakage portion of the target is preferentially subjected to sputtering. However, the leakage of the magnetic flux at the portion subjected to sputtering is larger than that at the fringe portion because of the magnetic flux having intrinsically passed through the inside of the target, and the leakage portion is increasingly subjected to sputtering and is pitted, whereby partial wear of the target occurs. In other words, when a soft magnetic target is subjected to magnetron sputtering, the sputtered portion is worn in the shape of a V-groove, and the backing plate is exposed in a relatively short time, whereby the life of the target is shortened. On the other hand, if a thin target is used in order to increase the leakage of magnetic flux on the target, the life of the target is shortened, and the target is required to be exchanged frequently. If an attempt is made to increase the thickness of the target in order to extend the life of the target, most of the magnetic flux from the magnetic circuit at the bottom passes through the inside of the target, and the external leakage of the magnetic flux becomes nearly lost. Therefore, the thickness cannot be increased significantly. Since the leakage of the magnetic field cannot be made large and since local sputtering is apt to occur, the number of sputtering vacuum baths serving as components of the sputtering apparatus is required to be increased. Otherwise, thick films cannot be formed. Furthermore, partial wear of the target affects the uniformity of the thickness of a formed film and the uniformity of the composition of an alloy. On the other hand, since the recording layer formed on the soft magnetic backing film is relatively thin, film formation is possible without problems in a dry process and any other process. Although the forming of the soft magnetic backing film for a perpendicular recording medium can be carried out in principle by the conventional sputtering method, the film formation has big problems in mass production efficiency and productivity as described above.

Moreover, as a problem peculiar to the perpendicular magnetic recording medium, noise occurs from the magnetic film of the perpendicular recording medium. The noise is broadly divided into medium noise from the recording magnetic film and spike noise from the soft magnetic backing film. The former also occurs in the case of horizontal recording. However, the latter, that is, the spike noise from the soft magnetic backing film, is peculiar to the perpendicular recording film. It has been recently thought that the spike noise occurs since the magnetic head picks up the magnetic field leaked from magnetic domain walls present in the soft magnetic backing layer. Reducing the spike noise from the soft magnetic backing film is one of the critical points required to be attained in order to commercialize the perpendicular recording film.

SUMMARY OF THE INVENTION

In consideration of the above-mentioned conventional film forming method and substrate construction, the present invention proposes a substrate that comprises an easily producible soft magnetic backing film and can reduce spike noise from the soft magnetic backing film, and also proposes a method for producing the substrate.

The present invention is intended to provide a hard disk substrate for perpendicular magnetic recording excellent in magnetic characteristics and productivity by forming a under layer and a soft magnetic metal backing layer having satisfactory adhesiveness and magnetic characteristics on a single crystal Si substrate and by smoothing the surface by polishing to obtain a satisfactory metallic surface. In other words, the present invention provides a hard disk substrate wherein a soft magnetic film is formed on a substrate made of an Si single crystal by a wet process. The soft magnetic film preferably has induced anisotropy on the surface thereof.

A schematic sectional view showing the film construction of a perpendicular magnetic recording medium in accordance with the present invention is shown in FIG. 1.

The present invention provides a substrate for a perpendicular magnetic recording hard disk medium, comprising an Si single crystal substrate 1 having a diameter of 65 mm or less, a thickness of 1 mm or less and an average surface roughness (Rms) of 1 nm or more and 1000 nm or less; an under-plated layer 2 formed on the substrate, the layer 2 having a thickness of 1 nm to 300 nm and comprising Ni and/or Cu and/or Ag; and a plated soft magnetic layer 3 formed on the under-plated layer 2, the layer 3 having a thickness of 50 nm or more and less than 1000 nm, coercivity (coercive force) of 20 Oe(oersteds) or less and a saturation magnetization of 1 T or more, wherein the average surface roughness (Rms) of the plated soft magnetic layer is 0.1 nm or more and 5 nm or less. The substrate has preferably induced anisotropy on the surface thereof. In addition, the present invention provides a method for producing a substrate for a perpendicular magnetic recording hard disk medium, comprising a step. of carrying out under-plating to form an under-plated layer comprising Ni and/or Cu and/or Ag on an Si single crystal substrate having a diameter of 65 mm or less, a thickness of 1 mm or less and an average surface roughness (Rms) of 1 nm or more and 1000 nm or less; a step of forming a plated soft magnetic layer having coercivity of 20 Oe(oersteds) or less and a saturation magnetization of 1 T or more on the under-plated layer in a magnetic-field having an intensity of 10 G or more and 1000 G or less; and a step of polishing the plated soft magnetic layer so as to have an average surface roughness (Rms) of 0.1 nm or more and 5 nm or less. The substrate has induced anisotropy on the surface thereof.

According to the present invention, a thick soft magnetic backing film can be easily formed on an Si single crystal substrate, and a satisfactory Si single crystal substrate for perpendicular magnetic recording, having secured surface roughness, can be provided.

DETAILED DESCRIPTION OF THE INVENTION

Figure 1:
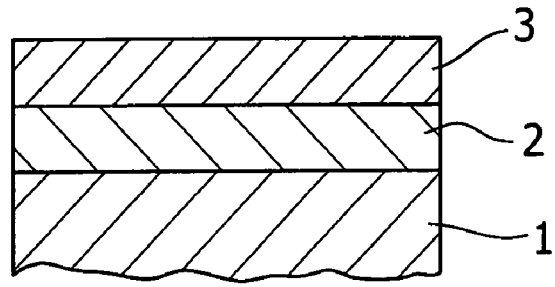
FIG. 1 is a schematic sectional view showing the film construction of a perpendicular magnetic recording medium in accordance with the present invention.
Figure 2:
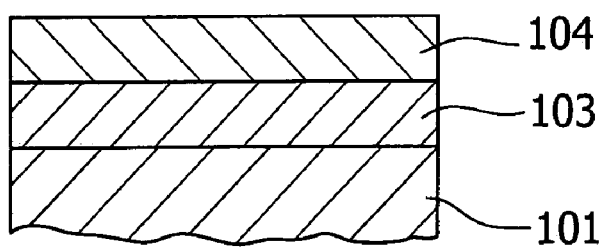
FIG. 2 is a schematic sectional view showing the film construction of the conventional horizontal magnetic recording medium.
Figure 3:
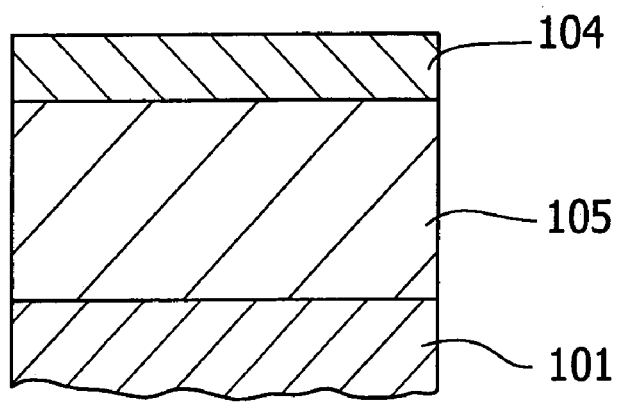
FIG. 3 is a schematic sectional view showing the film construction of the conventional perpendicular magnetic recording medium.

The present invention will be described below in detail.

According to the present invention, an Si single crystal substrate may be selected as a substrate. The Si single crystal substrate is excellent in rigidity, satisfactory in surface smoothness and very stable in the state of the surface, thereby being excellent as a high-density magnetic recording substrate. A Si substrate is well-known to be used as a magnetic recording substrate, and variety thereof has been proposed. Such substrates have been disclosed in Japanese Patent Publication (JP-B) Nos. 1-42048/'89, 2-41089/'90, 2-59523/'90, 1-45140/'89, Japanese Patent Provisional Publication (JP-A) Nos. 57-105826/'82, 6-68463/'94, 6-28655/'94, 4-259908/'92, etc., for example. Among these, a recording medium made by forming a under layer on an Si single crystal substrate and then by forming a recording layer thereon has also been disclosed (Japanese Patent Publication (JP-B) No. 2-41089). It is thus known that a Si single crystal is used as a horizontal magnetic recording substrate. However, since the substrate is a horizontal magnetic recording medium as described above, the problem of Brownian motion is not resolved.

The present invention is particularly intended to make improvements to resolve the problem of Brownian motion and relates to a substrate for perpendicular magnetic recording.

The Si single crystal substrate in accordance with the present invention is a substrate having a diameter of 65 mm or less and a thickness of 1 mm or less, and is used for small-diameter HDDs. If the diameter is more than 65 mm, the ratio of the material cost of the Si single crystal may become too high, whereby the substrate may be undesirable as a recording medium substrate. When a Si substrate having a diameter of 65 mm or less is used, since it is high in rigidity, less vibration occurs even if it is made thin, whereby it is suited for mobile applications. In addition, if the thickness is more than 1 mm, it may be technically difficult to make scattering values in the thickness at the various parts of the substrate constant by polishing, thereby being undesirable. Regarding the minimum dimension, a diameter of 20 mm or more may be desirable in view of the relationship with the other components constituting the hard disk drive and in view of the degree of difficulty and cost in component production. The lower limit of the thickness may be preferably 0.1 mm. The thickness may be more preferably in the range of 0.3 to 0.7 mm.

The square mean roughness (Rms) of the surface of the Si single crystal substrate in accordance with the present invention may be preferably 1 nm or more and 1000 nm or less. If the roughness is less than 1 nm, the adhesiveness of an under-plated layer formed on the substrate may become insufficient. If the roughness is more than 1000 nm, surface smoothness required for the hard disk may not be obtained. The square mean roughness (Rms) of the surface is the square root of the mean of the squares of deviations from the measurement average line to the measurement lines and can be measured by AFM (atomic force microscopy).

As described in Description of the Related Art, the inventors of the present invention thought that a dry process alone to form all films for perpendicular recording caused problems. Generally, the molding of a hard disk substrate material and the polishing of the substrate as surface finish are done by wet processes. Hence, considering that the portion up to the soft magnetic backing film was a part of the substrate, the inventors earnestly examined a process wherein the soft magnetic backing film was formed by a wet process (electroplating, electroless plating, etc.) and the smoothness was ensured by mechanochemical polishing (CMP).

When the formation of the under layer, the wet-type film formation of the soft magnetic layer and the subsequent smoothening are regarded as a part of substrate processing, the present invention is very compatible with the conventional substrate production process.

Another reason for selecting the Si single crystal substrate is that film formation can be carried out stably regardless of whether the pH value of the bath is acidic or alkaline in the wet-type film formation (film formation by plating). Further, since the substrate is made of a single material, extremely excellent coating uniformity is obtained in film formation by plating, thereby solving the problem of mutual action at the interface between the film and the substrate. In addition, by using the Si single crystal substrate, the crystallinity and structure refinement of the layers formed on the surface are satisfactory, whereby a high-quality soft magnetic backing layer can be formed.

Since the surface of a hard disk medium is frequently subjected to impact owing to the hitting of the head body referred to as "head slap" during usage, if the soft magnetic backing layer is only formed by a wet process, the film is low in adhesiveness and peeled off easily during usage. Moreover, according to the present invention, CMP polishing after plating is required to ensure surface smoothness. If the film formed by plating is low in adhesiveness, a problem of the plated film peeling off occurs in the middle of the CMP polishing.

The inventors investigated the adhesiveness between the Si substrate and the soft magnetic film and found that a plated film having satisfactory adhesiveness was able to be formed by carrying out appropriate plating treatment and plating pretreatment and that a smooth medium was able to be obtained by polishing this film.

In other words, the present invention is characterized in that an under-plated layer is formed between the Si substrate and the soft magnetic metal layer in order to enhance the adhesiveness between the Si substrate and the soft magnetic metal layer and to enhance the above-mentioned breaking strength.

According to the present invention, a layer having satisfactory adhesiveness can be formed between the Si substrate and the plated magnetic film by carrying out the pretreatment and/or the under-plating.

While investigating a method for removing an oxidized film formed naturally on the surface of an Si single crystal wafer in order to improve the adhesiveness, the inventors found that by etching the surface of the substrate preferably under particular conditions before under-plating the surface of the Si substrate, the oxidized film was removed and appropriate unevenness capable of appropriately improving the adhesiveness of the plated film to the surface of the substrate was produced, whereby the adhesiveness between the Si substrate and the magnetic film was improved significantly.

In other words, in order to form a satisfactory film by plating on the Si substrate, it is necessary to remove grease and naturally oxidized film in the same manner as conventional plating.

In addition, the process for removing the naturally oxidized film is an strongly recommended process for embodying the present invention.

According to the present invention, etching the surface of the Si substrate in the pretreatment prior to plating may be carried out by a wet process etching in an acid or an alkali. It is possible to have the etching both in acid and in alkali wherein alkali treatment is preferably carried out before acid treatment. By this plating pretreatment, the square mean roughness (Rms) of the Si single crystal substrate may be preferably set at 1 nm or more and 1000 nm or less.

More specifically, in the case of etching in an acid, the substrate may be immersed in an aqueous solution of one or more selected from the group consisting of hydrofluoric acid, hydrochloric acid and nitric acid.

As the condition of the etching solution, it is preferable that the concentration of the aqueous solution of hydrofluoric acid is 2 to 10% by weight, the concentration of the aqueous solution of nitric acid is 5 to 30% by weight, and the concentration of the aqueous solution of hydrochloric acid is 2 to 15% by weight.

However, according to the present invention, it may not be preferable to remove the oxidized film by etching in the aqueous solution of HF and to carry out plating.

When the Si substrate is etched in the aqueous solution of HF, it is known that the Si atoms on the surface are selectively bonded to H ions in the solution so that the surface is coated with H atoms. Consequently, hydrophobicity and ability for inhibiting reoxidation are kept for several hours. The metal film formed by plating on the substrate has very low adhesiveness to the surface of the substrate and is easily peeled off by a weak stress such as the stress of film washing.

It is possible to obtain the adhesiveness of the metal film by a mechanical anchor effect generated by roughening the surface of the substrate. However, in consideration of the application of the substrate for HDDs, excessive roughening on the surface to the degree of microns is not suited for forming a thin magnetic recording film thereon.

While investigating the method for removing the naturally oxidized film from the Si single crystal wafer in order to improve adhesiveness, the inventors found that the adhesiveness of the plated film was realized by etching the surface of the substrate having a slightly high surface roughness in an alkaline aqueous solution, thereby completing the present invention. According to etching in an alkali, the substrate may be immersed in an aqueous solution of one or more selected from the group consisting of NaOH, KOH and ammonia, for example.

A particularly preferable alkaline aqueous solution includes an aqueous solution obtained by mixing 0.3 to 10% by weight ammonia and 0.5 to 25% by weight hydrogen peroxide, preferably at a pure substance weight ratio of 2:1 to 1:2; and an aqueous solution of 2 to 50% by weight sodium hydroxide. By using such a solution, extremely satisfactory adhesiveness can be attained.

The treatment conditions are as follows: the immersion treatment can be carried out for 30 seconds to 1 hour at a temperature between 10° C. and the boiling point of the solution. In the case of acid treatment, electrolytic etching may be carried out by flowing electric current at 1 to 20 mA/cm$^2$ for 1 second to 1 minute.

In particular, the aqueous solution in which ammonia and hydrogen peroxide are mixed has a weak effect in removing the oxidized film from the surface in comparison with the aqueous solution of HF, and is used as a cleaning liquid for a chemical cleaning process, generally referred to as the Raytheon process, that is used to clean semiconductor wafers, glass for the electronic industry or the like.

As a result of investigation, when the Si single crystal substrate having been polished so as to leave predetermined minute roughness thereon was treated in this mixed etching solution, the inventors found that the oxidized film was able to be removed appropriately by etching without deteriorating the surface of the substrate and that the treatment had extremely preferable characteristics required for the plating pretreatment.

The Si single crystal substrate may be mirror-polished, preceding the pretreatment in this mixed etching solution prior to plating. The mirror polishing may be carried out to smoothen the surface of the substrate to obtain a surface roughness (Rms) of 1 to 1000 nm by using colloidal silica having an average grain diameter of 10 to 200 nm, for example.

The plating after the etching in the pretreatment can result in a film having satisfactory adhesiveness, formed between the Si substrate and the plated magnetic film. It may be conceivable that the adhesiveness between the plated film and the Si substrate is considerably attributable to a chemical microscopic mechanism by judging from the fact that sufficient adhesiveness is not obtained when a substrate having similar roughness and not being pretreated is subjected to plating, although the adhesiveness is also attributed to the surface roughness obtained by somewhat physical initial polishing, that is, an anchor effect.

When the substrate has been subjected to the prescribed pretreatment, it does not matter whether or not the subsequent under-plating is electrolytic plating or electroless plating. Although the under-plating is not particularly limited, Ni and/or Cu is preferably be used for film formation. The electroless plating may be rather preferable since its plating conditions are not dependent on the electrical characteristics of the Si substrate.

An under-plated layer can be formed, for example, by adding 0.2 to 1N ammonium chloride to 0.01 to 0.5N nickel sulfate. At that time, pH is adjusted in a range of 8 to 10, and plating can be carried out at a temperature of 75 to 95° C. The under-plated layer can also be formed by other methods. The plated layer formed preferably comprises one or more metals (in which alloys thereof may be included) selected from the group consisting of Ni, Cu and Ag. More preferably, Ni or Cu is used.

The thickness of the under-plated layer is preferably 1 nm or more and 300 nm or less. If the thickness is less than 1 nm, the surface of the substrate may not be coated uniformly. If the thickness is more than 300 nm, the crystal of the under film may be enlarged.

The soft magnetic backing layer formed on the Si single crystal substrate may comprise various kinds of alloy composition. In order to have satisfactory soft magnetism (low coercivity Hc), it is desirable to use an alloy which satisfies the requirement in which values of magnetocrystalline anisotropy $K_u$ and magnetostriction $\lambda_u$ are both zero simultaneously. In addition, regarding its saturation magnetization (Bs), a high permeability material having Bs of 1 T or more is preferable. A high permeability material having Bs of approximately 1.5 T such as a permalloy comprising 45 mol % Ni and 55 mol % Fe is particularly preferable. In addition, the soft magnetic layer material that can be used in the present invention includes materials capable of being used for film formation in a wet process and having soft magnetism, such as permalloy (NiFe-based alloys), CoNi-based alloys, CoFe-based alloys and CoFeNi-based alloys. Furthermore, in view of magnetic force, an alloy composition which can satisfy both the high saturation magnetization and low coercivity is desirable. The CoFeNi-based alloys have a relatively high saturation magnetization (Bs). Then, if the condition in which the values of both $K_u$ and $\lambda_u$ are equal to or close to "0" is satisfied, low Hc can be attained. In particular, the thin film of the CoFeNi-based alloy formed by electrolytic plating, reported by Osaka et al., has a fine-grained structure, and can satisfy both saturation magnetization of approximately 2 T and soft magnetism with Hc being no more than 20 Oe(oersteds). Hence, the CoFeNi-based alloy may be a very desirable material for the present invention. The material has been reported, for example, by T. Osaka et al., Nature 392, (1998), 796; by K. Ohashi et al., IEEE Trans. Mag. 35, (1999), 2538; by K. Ohashi et al., IEEE Trans. Mag. 34, (1998), 1462.

Although an FeTaC film and a Co-based amorphous film are also candidate materials for the backing film, since these films are formed by a dry process such as sputtering, they may not be included in some cases, according to the present invention. It is desirable that alloys being usable for film formation in a wet process are used as materials applicable to the present invention.

The permeability of the soft magnetic layer is set at 1 T or more in consideration of the limitation in film thickness because of the above-mentioned reasons. When a material having Bs of less than 1 T is used, its film thickness is required to be made larger in order to have performance necessary for a soft magnetic backing layer. Generally, when a thick metal layer is formed by a wet process or a dry process, the grains in the metal layer structure grow as the film thickness increases. In order to improve the S/N ratio in magnetic recording, it is very important to restrict the enlargement of the grain boundaries of the recording layer and the soft magnetic layer serving as a magnetic path during replay of record. In the wet process in accordance with the present invention, grain growth advances remarkably when the thickness of the soft magnetic layer is more than 1000 nm. In addition, the grain diameter distribution of the finely grained structure in the soft magnetic film expands and the nonuniformity of the grain size increases. Therefore, the film thickness is set at 50 to 1000 nm.

It is known that if the coercivity (iHc) is more than 20 Oe(oersteds), significant obstruction occurs when the magnetic flux generated from the head during writing passes through the soft magnetic layer, whereby the S/N ratio is lowered greatly in the case when such the film having such coercivity is used as a medium. According to the present invention, in view of this finding, as a requirement for specifying the soft magnetic layer, the coercivity is 20 Oe (oersteds) or less, preferably 5 Oe or less.

In order to obtain firm chemical binding in forming a soft magnetic film by electroplating on an Si single crystal substrate, it is necessary that metal ions in a plating solution directly receive electrons from the surface of the Si single crystal substrate when the metal under film is formed. When a film is formed by electroplating, it is desirable to use a material doped with impurities so as to include excessively paired electrons and have the negative polarity, instead of an intrinsic semiconductor Si single crystal. When the soft magnetic film is formed by electroless plating, the Si substrate may be an N-type, P-type or non-doped intrinsic single crystal.

Noise occurring from the magnetic film of a perpendicular recording medium is broadly divided into medium noise from the recording magnetic film and spike noise from the soft magnetic backing film. It is recently believed that the latter, that is, the spike noise from the soft magnetic backing film, occurs because the magnetic head picks up a magnetic field leaked from magnetic domain walls present in the soft magnetic backing film, as already described.

In order to reduce the spike noise, it is effective to eliminate the magnetic domain walls inside the soft magnetic backing film. In order to attain this, several proposals have been made. For example, it is proposed that the magnetic moment of the soft magnetic backing film is pinned to the lower portion of the film by exchange binding in a dry process. It is said that when a ferromagnetic hard film or antiferromagnetic film is added as the pinning layer, the soft magnetic backing film is loosely pinned effectively by the exchange magnetic field from the lower film, whereby the magnetic domain walls are reduced significantly, thereby being effective. However, the ferromagnetic hard film serving as the pinned layer is a source for supplying magnetic flux to the soft magnetic backing film and lowers permeability. Thus, the antiferromagnetic film is more desirable. In addition, it is said that the soft magnetic backing film having a layer structure comprising a soft magnetic layer and a nonmagnetic layer is effective in reducing magnetic domain walls.

Although it is confirmed that these methods are effective, these methods are proposed because it is difficult to reduce magnetic domain walls by using the soft magnetic backing film itself. The problem is that the film structure becomes complicated and the film production is not necessarily easy in view of efficient mass production.

According to-the present invention, magnetic domain walls are reduced by using the soft magnetic backing film itself. The soft magnetic backing film is formed by a wet method (typically a plating method). It is generally known that when a soft magnetic material is heat-treated, cooled or plated for film formation in a magnetic field, induced anisotropy is generated in the application direction of the magnetic field. In particular, regarding the induced anisotropy of FeNi alloys (permalloys), the explanations given by Neel and Taniguchi et al. are famous as the mechanism of directionally ordered array. The inventors thus carried out plating to form a soft magnetic backing film in a magnetic field by applying the magnetic field in the substantially radial or circumferential direction of the substrate, and found that a soft magnetic backing film having in-plane anisotropy, not causing any magnetic domain structure (in other words, not having magnetic domain walls) was able to be formed.

According to the present invention, since the soft magnetic backing film having in-plane induced anisotropy can be obtained as a single layer, it is not necessary to use a multi-layer structure inside the backing film or to use a layer for pinning the lower portion of the backing film.

The intensity of the magnetic field required for plating in the magnetic field is 10 G or more and 1000 G or less. If the intensity is lower than 10 G, sufficient induced anisotropy is not obtained. Even if the intensity is more than 1000 G, satisfactory induced anisotropy is obtained. However, devices such as a permanent-magnet magnetic circuit and an electromagnet for applying the magnetic field become large and too expensive, thereby being undesirable.

The soft magnetic layer is formed, for example, as follows. The 0.001 to 0.1N DMAB (dimethylamine borane), 0.002 to 0.2N nickel sulfate, 0.002 to 0.2N iron sulfate, 0.01 to 1N cobalt sulfate and others are used. A brightening agent such as saccharin, a chelating agent such as tartaric acid, citric acid or EDTA, and/or a stress moderating agent such as methylcarbobenzodiazothiazol may be added appropriately. The mixture is adjusted to pH 6 to pH 13, and the film can be formed at a temperature of 55 to 75° C.

The surface roughness of the soft magnetic film formed by the wet process on the Si single crystal substrate is not satisfactory, although the roughness differs depending on the thickness of the film. The surface roughness of the film formed by the wet process is ensured by polishing the surface of the backing film. The polishing can be carried out by mechanical polishing or CMP. Unlike the ordinary polishing method using only polishing slurry, CMP is conducted together with chemical polishing using an acid or alkaline polishing solution. A polishing medium includes colloidal alumina, colloidal silica or the like. The CMP using a colloidal polishing medium is high in polishing speed and offers significantly improved surface roughness, thereby being highly suited as a method for polishing perpendicular magnetic recording media. This is because the grain diameter of the colloidal polishing medium is a very small value of 10 to 100 nm and because the shape of the grain is nearly spherical, whereby excellent smoothness can be attained. In addition, according to CMP, the surface is not simply shaved away mechanically but polished in chemically dissolving manner. Hence, even when a finely grained spherical polishing medium is used, industrially sufficient polishing speed can be attained.

The type and pH value of the polishing slurry to be used are different depending on the alloy composition of a material to be polished (the soft magnetic backing film in the present invention). For example, in the case of a CoFeNi film, the polishing slurry is preferably alkaline, pH 10 or more. However, in the case of a permalloy film, the polishing slurry is preferably acidic in view of the chemical etching action.

The polishing conditions are optimized so that the surface roughness of each alloy composition film becomes satisfactory. Parameters affecting the polishing include the type and size of a machine, polishing slurry (polishing material, pH value and solution temperature), buffing, rotation speed. The conditions are required to be optimized in consideration of these parameters.

The present invention relates to the under film of a high-density recording hard disk. It is preferable that polishing is carried out so that the smoothness of the film after the polishing is an average surface roughness (Ra) or a square mean roughness (Rms) of 0.1 nm or more and 5 nm or less, particularly preferably 0.1 to 0.5 nm. If it is less than 0.1 nm, multi-stage CMP is required or the ranges of the conditions become extremely rigid, thereby being undesirable. Furthermore, if it is more than 5 nm, the surface roughness of a recording film to be placed on the backing film is affected adversely, whereby the surface roughness is desired to be not more than this value. The average surface roughness (Ra) is the average of the absolute deviations from the measurement average line to the measurement lines. The square mean roughness (Rms) is the square root of the mean of the squares of deviations from the measurement average line to the measurement lines. These can be measured by AFM.

The substrate, the smoothness of which is improved by the CMP, may be cleaned by brush cleaning or the like to remove particles attached to the surface.

Although ordinary mechanical polishing or the like using oxide slurry for glass polishing can also be used, this polishing may be low in polishing speed and require multi-stage polishing to obtain a satisfactory polished surface as described above. Hence, CMP is preferable. When the Si single crystal substrate having the smooth surface of backing film by CMP is used, an alloy-based recording film or a multi-layer film, each having a various composition, can be formed on the substrate, whereby an excellent perpendicular magnetic recording medium can be obtained.

Examples of the present invention will be described below; however, the present invention is not construed to be limited to these examples.

EXAMPLE 1

Both surfaces of a (100) Si single crystal (a P-doped N-type substrate) having a diameter of 65 mm, which had been produced by cutout, edge-removal and lapping of a single crystal substrate with diameter of 200 mm fabricated by the CZ (Czochralski) method, were polished by colloidal silica having a mean particle size of 95 nm so as to be smoothened to an average surface roughness (Rms) of 5 nm (measured by AFM (atomic force microscopy)). This substrate was immersed and etched for 5 minutes at 80° C. in an aqueous solution in which saturated aqueous hydrogen peroxide solution was mixed with 30 wt % aqueous ammonia, the concentration of each being 2 wt %, thereby removing a thin oxidized film on the surface of the substrate. This substrate was subjected to electroless plating at 80° C. in a plating solution prepared by appropriately adding ammonium chloride to an aqueous solution of 0.1N nickel sulfate and 0.1N sodium tartrate so as to have pH 8. Consequently, the surface was coated with an Ni plated film having a thickness of 100 nm. Then, a CoNiFe soft magnetic film having a thickness of approximately 1000 nm was formed as a soft magnetic layer. The plating was carried out to form the film at 80° C. in an ammonium chloride bath mainly comprising Co, Ni and Fe and having a value of pH 9, to which hypophosphrous acid serving as a reducing agent and saccharin and the like serving as brightening and stress moderating agents were added appropriately.

After the film formation, elemental analysis was carried out according to the wave length dispersion method by EPMA. The composition of the film was approximately 15 mol % Ni, 75 mol % Fe and 10 mol % Co. When the magnetic characteristics were measured by using VSM (vibrating sample magnetometer), Bs was 1.9 T and iHc was 15 Oe(oersteds). The film exhibited a low coercivity and soft magnetism.

The substrate with the soft magnetic film formed thereon was polished for 6 minutes by a double-sided polishing machine with a surface plate having a diameter of 700 mm and covered with nonwoven fabric while a pressure of 180 gf/cM$^2$ was applied by using a polishing solution including colloidal silica having a mean particle size of 80 nm at pH 11 and at a solution temperature of 30° C., whereby a soft magnetic film having a thickness of approximately 400 nm was obtained. When the surface roughness after the polishing was measured by AFM, Rms was 0.6 nm, and nearly the entire surface of the substrate was smoothened.

In order to check the adhesiveness of the plated film, the surface of the substrate was coated with a diamond-like carbon (DLC) protection film having a thickness of 20 nm by magnetron sputtering and built into a 2.5-inch hard disk unit MK-4313MAT manufactured by Toshiba Corp. In a state wherein the head was in close contact with the substrate, a durability test (a head slap test) to apply an impact of 750 G was carried out by using SM-105MP manufactured by AVEX Inc. When the surface of the substrate was observed with an optical microscope having a magnification of 30 after the test, it was confirmed that the plated film was not peeled off at all, although impact traces were confirmed.

EXAMPLE 2

Both surfaces of a (100) Si single crystal (a P-doped N-type substrate) having a diameter of 65 mm, which had been produced by cutout, edge-removal and lapping of a single crystal substrate with diameter of 200 mm fabricated by the CZ method, were polished by using colloidal silica (having a mean particle size of 95 nm) so as to be smoothened to an average surface roughness (Rms) of 0.4 nm (measured by AFM). This substrate was immersed and etched for 10 minutes at 50° C. in an aqueous solution of 40 wt % caustic soda, thereby removing a thin oxidized film on the surface of the substrate and roughening the surface to a surface roughness Rms of 10 nm. This substrate was subjected to electroless plating at 80° C. in a plating solution prepared by appropriately adding sodium hydroxide to an aqueous solution of 0.1N nickel sulfate and 0.1N sodium tartrate so as to have pH 9. Consequently, the surface was coated with a Ni plated film having a thickness of 150 nm. Then, a CoNiFe soft magnetic film having a thickness of approximately 1000 nm was formed as a soft magnetic layer. The plating was carried out to form the film at 80° C. in an ammonium chloride bath mainly comprising Co, Ni and Fe and having a value of pH 9, to which hypophosphrous acid serving as a reducing agent and saccharin and the like serving as brightening and stress moderating agents were added appropriately.

After the film formation, elemental analysis was carried out according to the wave length dispersion method by EPMA. The composition of the film was approximately 60 mol % Co, 10 mol % Ni and 30 mol % Fe. When the magnetic characteristics were measured by using VSM, Bs was 1.9 T and iHc was 2 Oe(oersteds) The film exhibited a low coercivity and soft magnetism.

The substrate with the soft magnetic film formed thereon was polished for 6 minutes by a double-sided polishing machine with a surface plate having a diameter of 700 mm and covered with nonwoven fabric while a pressure of 180 gf/cm$^2$ was applied by using a polishing solution including colloidal silica having a mean particle size of 80 nm at pH 11 and at a solution temperature of 30° C., whereby a soft magnetic film having a thickness of approximately 400 nm was obtained. When the surface roughness after the polishing was measured by AFM, Rms was 0.6 nm, and nearly the entire surface of the substrate was smoothened.

In order to check the adhesiveness of the plated film, the surface of the substrate was coated with a diamond-like carbon (DLC) protection film having a thickness of 20 nm by magnetron sputtering and built into a 2.5-inch hard disk unit MK-4313MAT manufactured by Toshiba Corp. In a state wherein the head was in close contact with the substrate, a durability test (a head slap test) to apply an impact of 750 G was carried out by using SM-105MP manufactured by AVEX Inc. When the surface of the substrate was observed with an optical microscope having a magnification of 30 after the test, it was confirmed that the plated film was not peeled off at all, although impact traces were confirmed.

EXAMPLE 3

Both surfaces of a (100) Si single crystal (a P-doped N-type substrate) having a diameter of 65 mm, which had been produced by cutout, edge-removal and lapping of a single crystal substrate with diameter of 200 mm fabricated by the CZ method, were polished by using colloidal silica (having a mean particle size of 95 nm) so as to be smoothened to an average surface roughness (Rms) of 0.4 nm (measured by AFM). This substrate was immersed in 4 wt % aqueous solution of HF for 1 minute at 18° C. and electric current (5 mA/cm$^2$) was flown for 10 seconds, thereby removing a thin oxidized film on the surface of the substrate by anodic oxidation and roughening the surface to a surface roughness Rms of 12 nm. This substrate was subjected to electroless plating at 80° C. in a plating solution prepared by appropriately adding sodium hydroxide to an aqueous solution of 0.1N nickel sulfate and 0.1N sodium citrate so as to have pH 8. Consequently, the surface was coated with a Ni plated film having a thickness of 180 nm. Then, a CoNiFe soft magnetic film having a thickness of approximately 1000 nm was formed as a soft magnetic layer. The plating was carried out to form the film at 80° C. in an ammonium chloride bath mainly comprising Co, Ni and Fe and having a value of pH 9, to which dimethylamine borane serving as a reducing agent and saccharin and the like serving as brightening and stress moderating agents were added appropriately.

After the film formation, elemental analysis was carried out according to the wavelength dispersion method by EPMA. The composition of the film was approximately 60 mol % Co, 10 mol % Ni and 30 mol % Fe. When the magnetic characteristics were measured by using VSM, Bs was 1.9T and iHc was 2 Oe(oersteds). The film exhibited a low coercivity, and soft magnetism.

The substrate with the soft magnetic film formed thereon was polished for 6 minutes by a double-sided polishing machine with a surface plate having a diameter of 700 mm and covered with nonwoven fabric while a pressure of 180 gf/cm$^2$ was applied by using a polishing solution including colloidal silica having a mean particle size of 80 nm at pH 11 and at a solution temperature of 30° C., whereby a soft magnetic film having a thickness of approximately 400 nm was obtained. When the surface roughness after the polishing was measured by AFM, Rms was 0.6 nm, and nearly the entire surface of the substrate was smoothened.

In order to check the adhesiveness of the plated film, the surface of the substrate was coated with a diamond-like carbon (DLC) protection film having a thickness of 20 nm by magnetron sputtering and built into a 2.5-inch hard disk unit MK-4313MAT manufactured by Toshiba Corp. In a state wherein the head was in close contact with the substrate, a durability test (a head slap test) to apply an impact of 750 G was carried out by using SM-105MP manufactured by AVEX Inc. When the surface of the substrate was observed with an optical microscope having a magnification of 30 after the test, it was confirmed that the plated film was not peeled off at all, although impact traces were confirmed.

Hence, a satisfactory soft magnetic film for a perpendicular recording medium substrate was formed by a wet process, and satisfactory soft magnetism and the smoothening of the soft magnetic film were attained. As a result, a substrate highly suited for a perpendicular magnetic recording medium was provided.

EXAMPLE 4

Both surfaces of a (100) Si single crystal (a P-doped N-type substrate) having a diameter of 65 mm, which had been produced by cutout, edge-removal and lapping of a single crystal substrate with diameter of 200 mm fabricated by the CZ method, were polished by using colloidal silica (having a mean particle size of 95 nm) so as to be smoothened to an average surface roughness (Rms) of 5 nm (measured by AFM). This substrate was immersed and etched at 80° C. in an aqueous solution in which saturated aqueous hydrogen peroxide solution was mixed with 30 wt % aqueous ammonia, the concentration of each being 2 wt %, thereby removing a thin oxidized film on the surface of the substrate. This substrate was subjected to electroless plating at 80° C. in a plating solution prepared by appropriately adding ammonium chloride to an aqueous solution of 0.1N nickel sulfate and further adding a small amount of ammonia water so as to have pH 8. Consequently, the surface was coated with an Ni plated film having a thickness of 50 nm. Then, a CoNiFe soft magnetic film having a thickness of approximately 1000 nm was formed as a soft magnetic layer. The plating was carried out to form a film at 80° C. in an ammonium chloride bath mainly comprising Co, Ni and Fe and having a value of pH 9, to which dimethylamine borane serving as a chelating agent and saccharin and the like serving as brightening and stress moderating agents were added appropriately. The Ni plated film and the soft magnetic $CO_2Ni_{14}Fe$ plated film were formed in a magnetic field having an intensity of 200 G. The magnetic field was generated from a magnetic circuit comprising NdFeB rare earth permanent magnets opposed to each other and disposed so as to hold the plating bath therebetween.

After the film formation, elemental analysis was carried out according to the wavelength dispersion method by EPMA. The composition of the film was approximately 60 mol % Co, 10 mol % Ni and 30 mol % Fe. When the magnetic characteristics were measured by using VSM (vibrating sample magnetometer), Bs was 1.9 T and iHc was 2 Oe(oersteds). The film exhibited a low coercivity and soft magnetism.

The substrate with the soft magnetic film formed thereon was polished for 6 minutes by a double-sided polishing machine with a surface plate having a diameter of 700 mm and covered with nonwoven fabric while a pressure of 180 Gf/cm$^2$ was applied by using a polishing solution including colloidal silica having a mean particle size of 80 nm at pH 11 and at a solution temperature of 30° C., whereby a soft magnetic film having a thickness of approximately 400 nm was obtained. When the surface roughness after the polishing was measured by AFM, Rms was 0.6 nm, and nearly the entire surface of the substrate was smoothened. In addition, when the presence or absence of magnetic domain walls was checked by MFM at 20 different sampling points in the substrate, no magnetic domain walls were found.

In order to check the adhesiveness of the plated film, the surface of the substrate was coated with a diamond-like carbon (DLC) protection film having a thickness of 20 nm by magnetron sputtering and built into a 2.5-inch hard disk unit MK-4313MAT manufactured by Toshiba Corp. In a state wherein the head was in close contact with the substrate, a durability test (a head slap test) to apply an impact of 750 G was carried out by using SM-105MP manufactured by AVEX Inc. When the surface of the substrate was observed with an optical microscope having a magnification of 30 after the test, it was confirmed that the plated film was not peeled off at all, although impact traces were confirmed.

Hence, a satisfactory soft magnetic film for a perpendicular recording medium substrate was formed by a wet process, and satisfactory soft magnetism and the smoothening of the soft magnetic film were attained. As a result, a substrate highly suited for a perpendicular magnetic recording medium was provided.

The invention claimed is:

1. A method for producing a substrate for a perpendicular magnetic recording hard disk medium, comprising steps of:
   a) carrying out under-plating to form an under-plated layer comprising one or more metals selected from a group consisting of Ni, Cu and Ag on an Si single crystal substrate having a diameter of 65 mm or less, a thickness of 1 mm or less and an average surface roughness (Rms) of 1 nm or more and 1000 nm or less;
   b) forming a plated soft magnetic layer having coercivity of 20 Oe(oersteds) or less and a saturation magnetization of 1T or more on said under-plated layer; and
   c) polishing said plated soft magnetic layer so as to have an average surface roughness (Rms) of 0.1 nm or more and 5 nm or less,
wherein said under-plated layer of step a) and said soft magnetic layer of step b) are formed by a wet process, and wherein either step a) for carrying out the under-plating or step b) for forming said plated, soft magnetic layer comprises electroless plating.

2. The method for producing a substrate for a perpendicular magnetic recording hard disk medium according to claim 1, comprising a pretreatment step of etching said Si single crystal substrate preceding the step of carrying out the under-plating.

3. The method for producing a substrate for a perpendicular magnetic recording hard disk medium according to claim 1, wherein step a) for carrying out the under-plating comprises electroless plating.

4. The method for producing a substrate for a perpendicular magnetic recording hard disk medium according to claim 1, wherein the pretreatment step comprises chemically etching the Si single crystal substrate.

5. The method for producing a substrate for a perpendicular magnetic recording hard disk medium according to claim 2, wherein the pretreatment step comprises etching in an alkaline aqueous solution comprising one or more selected from the group consisting of NaOH, KOH and ammonia.

6. The method for producing a substrate for a perpendicular magnetic recording hard disk medium according to claim 2, wherein the pretreatment step comprises etching in an acidic aqueous solution comprising one or more selected from the group consisting of hydrofluoric acid, hydrochloric acid and nitric acid.

7. The method for producing a substrate for a perpendicular magnetic recording hard disk medium according to claim 1, wherein said substrate has induced anisotropy on the surface thereof.

8. The method for producing a substrate for a perpendicular magnetic recording hard disk medium according to claim 1, wherein said step of forming said plated soft magnetic layer is carried out in a magnetic field having an intensity of 10 G or more and 1000 G or less.

9. The method for producing a substrate for a perpendicular magnetic recording hard disk medium according to claim 1, preceding the step of carrying out the under-plating, comprising a step of mirror-polishing said Si single crystal substrate and a subsequent pretreatment step of etching in a mixed aqueous solution of ammonia and hydrogen peroxide.

10. The method for producing a substrate for a perpendicular magnetic recording hard disk medium according to claim 1, wherein step b) for forming said plated soft magnetic layer comprises electroless plating.

11. The method for producing a substrate for a perpendicular magnetic recording hard disk medium according to claim 1, wherein both step a) for carrying out the under-plating and step b) for forming plated soft magnetic layer comprise electroless plating.

* * * * *

UNITED STATES PATENT AND TRADEMARK OFFICE
CERTIFICATE OF CORRECTION

PATENT NO. : 7,238,384 B2 Page 1 of 1
APPLICATION NO. : 11/181109
DATED : July 3, 2007
INVENTOR(S) : Tsumori It is certified that error appears in the above-identified patent and that said Letters Patent is hereby corrected as shown below:

On Title Page:

Item (62): Please correct to read
--Division of application No. 10/646,506, filed on
August 22, 2003, now abandoned.--

Signed and Sealed this

Second Day of October, 2007

JON W. DUDAS
*Director of the United States Patent and Trademark Office*